US009373327B2

(12) United States Patent
Lavallee

(10) Patent No.: US 9,373,327 B2
(45) Date of Patent: *Jun. 21, 2016

(54) METHOD FOR REFINING A SEARCH

(71) Applicant: Nuance Communications, Inc., Burlington, MA (US)

(72) Inventor: Jean-Francois Lavallee, Verdun (CA)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/677,426

(22) Filed: Apr. 2, 2015

(65) Prior Publication Data

US 2015/0287404 A1    Oct. 8, 2015

Related U.S. Application Data

(63) Continuation of application No. 13/792,954, filed on Mar. 11, 2013, now Pat. No. 9,015,045.

(51) Int. Cl.
G10L 15/08    (2006.01)
G06F 17/30    (2006.01)

(52) U.S. Cl.
CPC .......... *G10L 15/08* (2013.01); *G06F 17/30401* (2013.01); *G06F 17/30976* (2013.01)

(58) Field of Classification Search
CPC .......... G06F 17/30976; G06F 17/3043; G10L 15/30; G10L 15/22; G10L 15/142; G10L 15/18
USPC .......... 704/254, 251, 233, 275, 257
See application file for complete search history.

(56) References Cited

U.S. PATENT DOCUMENTS

| 6,178,404 | B1 * | 1/2001 | Hambleton et al. .......... 704/275 |
| 7,801,729 | B2 | 9/2010 | Mozer |
| 8,660,847 | B2 * | 2/2014 | Soemo et al. .................. 704/251 |
| 9,015,045 | B2 | 4/2015 | Lavallee |
| 2012/0232899 | A1 | 9/2012 | Koval |
| 2014/0257811 | A1 | 9/2014 | Lavallee |

OTHER PUBLICATIONS

Notice of Allowance in related U.S. Appl. No. 13/792,954, mailed Jan. 14, 2015, 9 pages.

* cited by examiner

*Primary Examiner* — Charlotte M Baker
(74) *Attorney, Agent, or Firm* — Mark H. Whittenberger, Esq.; Holland & Knight LLP

(57) ABSTRACT

A method for refining a search is provided. Embodiments may include receiving a first speech signal corresponding to a first utterance and receiving a second speech signal corresponding to a second utterance, wherein the second utterance is a refinement to the first utterance. Embodiments may also include determining a first quantity of search results based upon the first speech signal information and determining a second quantity of search results based upon the second speech signal information. Embodiments may also include comparing at least one of the first quantity of search results and the second quantity of search results with a third quantity of search results and determining an information gain from the comparison.

17 Claims, 4 Drawing Sheets

METHOD FOR REFINING A SEARCH

RELATED APPLICATIONS

The subject application is a continuation application of U.S. patent application with Ser. No. 13/792,954, filed on Mar. 11, 2013, the entire content of which is herein incorporated by reference.

TECHNICAL FIELD

This disclosure relates to search refinement systems and, more particularly, to a method for refining a search such as those associated with speech recognition systems.

BACKGROUND

Automatic speech recognition may refer to the transcription, by a computing device, of spoken language into readable text. Some speech recognition (SR) systems use "training" where a speaker may read sections of text into the SR system. These systems are often configured to analyze the person's specific voice and use it to fine tune the recognition of that person's speech, resulting in more accurate transcription. Further, many speech recognition systems may include one or more databases of information that may be searched in accordance with a user's spoken words. Some of these systems may include a search refinement process in order to more effectively identify the subject matter that the user is interested in obtaining

SUMMARY OF DISCLOSURE

In one implementation, a method, in accordance with this disclosure, may include receiving a first speech signal corresponding to a first utterance and receiving a second speech signal corresponding to a second utterance, wherein the second utterance is a refinement to the first utterance. Embodiments may also include determining a first quantity of search results based upon the first speech signal information and determining a second quantity of search results based upon the second speech signal information. Embodiments may also include comparing at least one of the first quantity of search results and the second quantity of search results with a third quantity of search results and determining an information gain from the comparison.

One or more of the following features may be included. In some embodiments, the method may include identifying a search expansion, based upon, at least in part, the information gain. The method may also include refining a search based upon at least in part, the information gain. The method may further include generating at least one set of search results based upon the refined search. In some embodiments, refining may be based upon, at least in part, one or more features vectors. In some embodiments, refining may include, at least in part, calculating a score for one or more potential refinement sources. The method may further include identifying a refinement source from the one or more potential refinement sources based upon, at least in part, the score.

In another implementation, a system is provided. The system may include one or more computing devices configured to receive a first speech signal corresponding to a first utterance and to receive a second speech signal corresponding to a second utterance, wherein the second utterance is a refinement to the first utterance. The one or more processors may be further configured to determine a first quantity of search results based upon the first speech signal information and to determine a second quantity of search results based upon the second speech signal information. The one or more processors may be further configured to compare at least one of the first quantity of search results and the second quantity of search results with a third quantity of search results. The one or more processors may be configured to determine an information gain from the comparison.

One or more of the following features may be included. In some embodiments, the one or more processors may be further configured to identify a search expansion, based upon, at least in part, the information gain. The one or more processors may be further configured to refine a search based upon at least in part, the information gain. In some embodiments, the one or more processors may be further configured to generate at least one set of search results based upon the refined search. In some embodiments, refining may be based upon, at least in part, one or more features vectors. In some embodiments, refining may include, at least in part, calculating a score for one or more potential refinement sources. The one or more processors may be further configured to identify a refinement source from the one or more potential refinement sources based upon, at least in part, the score.

In some embodiments, a computer-readable storage medium for refining a search is provided. The computer-readable storage medium may have stored thereon instructions that when executed by a machine result in one or more operations. Operations may include receiving a first speech signal corresponding to a first utterance and receiving a second speech signal corresponding to a second utterance, wherein the second utterance is a refinement to the first utterance. Embodiments may also include determining a first quantity of search results based upon the first speech signal information and determining a second quantity of search results based upon the second speech signal information. Embodiments may also include comparing at least one of the first quantity of search results and the second quantity of search results with a third quantity of search results and determining an information gain from the comparison.

One or more of the following features may be included. In some embodiments, operations may include identifying a search expansion, based upon, at least in part, the information gain. Operations may also include refining a search based upon at least in part, the information gain. In some embodiments, operations may further include generating at least one set of search results based upon the refined search. In some embodiments, refining may be based upon, at least in part, one or more features vectors. In some embodiments, refining may include, at least in part, calculating a score for one or more potential refinement sources. Operations may further include identifying a refinement source from the one or more potential refinement sources based upon, at least in part, the score.

The details of one or more implementations are set forth in the accompanying drawings and the description below. Other features and advantages will become apparent from the description, the drawings, and the claims.

DETAILED DESCRIPTION OF THE EMBODIMENTS

Embodiments provided herein are directed towards applying information gain ratio to a search dialog for detection of search refinement and risk evaluation of the refinement. Embodiments of the search refinement process described herein may be used to improve the performance of the search refinement dialog. In some embodiments, a search dialog may refer to a dialog that may be used to find an element based on one or more attributes, often as a subtask. In some embodiments, a search refinement may refer to a situation where the current search query is built upon information available in the previous searches. In some embodiments, the search refinement process described herein may be configured to estimate the potential gain on search results of the refinement on a database covering a subset of the element that the user could be looking for in order to identify a case of search expansion and to adapt the decision to the risk associated with that particular case. It should be noted that although much of the discussion of search refinement process 10 is focused upon speech technology it should be noted that the teachings of the present disclosure are not limited to speech applications, as such, the examples included herein are provided merely by way of example and not of limitation.

Figure 1:
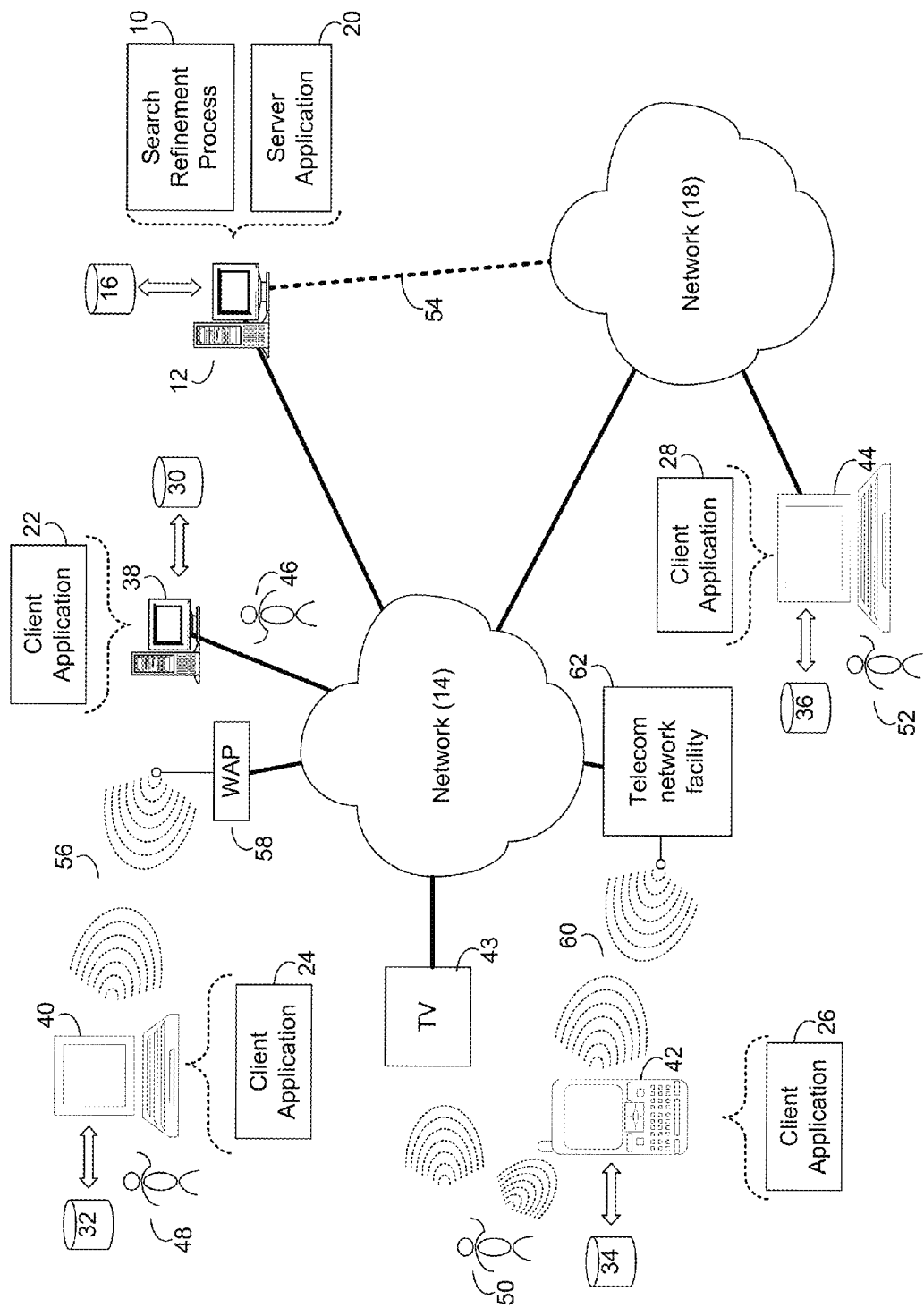
FIG. 1 is a diagrammatic view of a search refinement process in accordance with an embodiment of the present disclosure.

Referring to FIG. 1, there is shown a search refinement process 10 that may reside on and may be executed by computer 12, which may be connected to network 14 (e.g., the Internet or a local area network). Server application 20 may include some or all of the elements of search refinement process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, a multiprocessor computer, one or more virtual machines running on a computing cloud, and/or a distributed system. The various components of computer 12 may execute one or more operating systems, examples of which may include but are not limited to: Microsoft Windows Server™; Novell Netware™; Redhat Linux™, Unix, or a custom operating system, for example.

Figure 2:
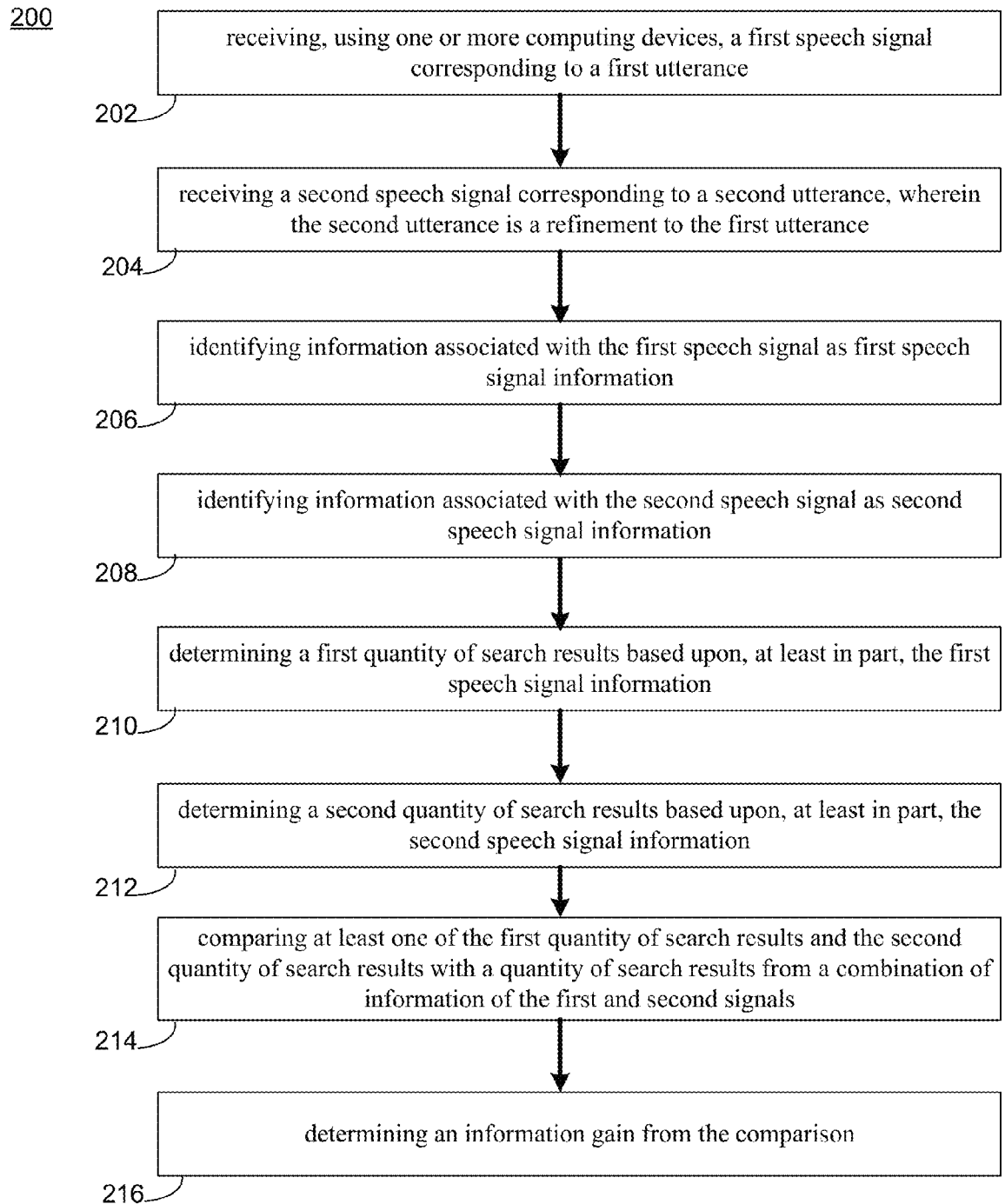
FIG. 2 is a flowchart of a search refinement process in accordance with an embodiment of the present disclosure.

As will be discussed below in greater detail, and as shown in FIG. 2, search refinement process 10 may include receiving (202) a first speech signal corresponding to a first utterance and receiving (204) a second speech signal corresponding to a second utterance, wherein the second utterance is a refinement to the first utterance. Embodiments may also include identifying (206) information associated with the first speech signal as first speech signal information and identifying (208) information associated with the second speech signal as second speech signal information. Embodiments may also include determining (210) a first quantity of search results based upon the first speech signal information and determining (212) a second quantity of search results based upon the second speech signal information. Embodiments may also include comparing (214) at least one of the first quantity of search results and the second quantity of search results with a quantity of search results from a combination of information of the first and second signals and determining (216) an information gain from the comparison.

The instruction sets and subroutines of search refinement process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

In some embodiments, search refinement process 10 may be accessed and/or activated via client applications 22, 24, 26, 28. Examples of client applications 22, 24, 26, 28 may include but are not limited to a standard web browser, a customized web browser, or a custom application that can display data to a user. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, television 43, notebook computer 44, a server (not shown), a data-enabled, cellular telephone (not shown), and a dedicated network device (not shown).

One or more of client applications 22, 24, 26, 28 may be configured to effectuate some or all of the functionality of search refinement process 10. Accordingly, search refinement process 10 may be a purely server-side application, a purely client-side application, or a hybrid server-side/client-side application that is cooperatively executed by one or more of client applications 22, 24, 26, 28 and search refinement process 10.

Client electronic devices 38, 40, 42, 44 may each execute an operating system, examples of which may include but are not limited to Apple iOS™, Microsoft Windows™, Android™, Redhat Linux™, or a custom operating system.

Users 46, 48, 50, 52 may access computer 12 and search refinement process 10 directly through network 14 or through secondary network 18. Further, computer 12 may be connected to network 14 through secondary network 18, as illustrated with phantom link line 54. In some embodiments, users may access search refinement process 10 through one or more telecommunications network facilities 62.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and smart phones to be interconnected using a short-range wireless connection.

Smart phone 42 is shown wirelessly coupled to network 14 via wireless communication channel 60 established between smart phone 42 and telecommunications network facility 62, which is shown directly coupled to network 14.

The phrase "telecommunications network facility", as used herein, may refer to a facility configured to transmit, and/or receive transmissions to/from one or more mobile devices (e.g. cellphones, etc). In the example shown in FIG. 1, telecommunications network facility 62 may allow for communication between TV 43, cellphone 42 and server computing device 12.

In some embodiments, search refinement process 10 may work in conjunction with one or more additional search refinement techniques. Some examples of the common cases of search refinement in the context of a user searching for programming associated with a television (e.g. user 50 speaking to television 43) are provided below:

Dialog 1:
1. "I'd like to see some westerns"
2. "Any with Kevin Costner?"
3. "Silverado"

Dialog 2:
1. "show me a Vietnam war movie by Coppola"
2. "by anyone?"

Dialog 3:
1. "I'd like to see an Arnold action movie"
2. "What about Stallone?"

Dialog 4:
1. "Show me Kubrick movie"
2. "The one starring Mcdowell"
3. "What about the horror movie with Nicholson"
4. "Watch the McDowell one"

It should be noted that the teachings of the present disclosure do not require that the refined signal be consecutive to the source signal as it may be separated by one or more additional signals. Typically, search refinement techniques involve one or more operations, some of which may include, but are not limited to, features extraction, source selection, and a refined interpretation builder. Each of these are discussed in further detail hereinbelow.

In some embodiments, features extraction may include the construction of a matrix composed of the features vectors of every potential refinement source. For example, for the following example dialog:

Dialog 5:
1. "I'd like to see some westerns"
2. "Any with Kevin Costner?"
3. "Silverado"

The resulting matrix M is provided below where $f_x$ is a function that may extract a numeric feature from two signals. Such a function may include, but is not limited to, the information gain ratio of the combined signal relative to the potential source:

$$\begin{matrix} -1: \\ 1: \\ 2: \end{matrix} \begin{bmatrix} f_1(\{Silverado\}, \emptyset) & \ldots & f_F(\{Silverado\}, \emptyset) \\ f_1(\{Silverado\}, \{western\}) & \ldots & f_F(\{Silverado\}, \{western\}) \\ f_1(\{Silverado\}, \{western, costner\}) & \ldots & f_F(\{Silverado\}, \{western, costner\}) \end{bmatrix} \quad \text{Equation 1}$$

In some embodiments, features extraction may involve basic and/or domain specific features. Some basic features may include, but are not limited to, the distance in utterance, the distance in task, the number of resolved reference by the refinement source, the number of unresolved reference, repeated information count, etc. Additionally and/or alternatively, some domain specific features may include, but are not limited to, semantic relationship (Max conditional probability, Normalized pointwise mutual information (NPMI)), semantic relationship between interpretation, average semantic relationship score of signal information, maximal semantic relationship score of signal information, usefulness of the refinement (Information gain ratio (IGR) inspired metric), etc.

An example depicting the semantic relationship between signals is provided below. In this particular example, $H_x$ is the current (refined) signal, $H_o$ is a potential source, P(H) is the probability of a entity of the knowledge base of having the attributes contained in information of the signal H and N is the total number of entity in the database:

$$Npmi(Hx, HO) = \log\left(\frac{P(Hx \cup Ho)}{P(Hx) * P(Ho)}\right) * \frac{-1}{\log P(Hx \cup Ho)} \quad \text{Equation 2}$$

An example depicting the maximum conditional probability is provided below:

$$\max Prb(Hx, Ho) = \max(P(Hx \cup Ho \backslash Hx), P(Hx \cup Ho \backslash Ho)) \quad \text{Equation 3}$$

An example depicting the average semantic relationship on information (calculated for both metrics) is provided below. The example is with the NPMI metric:

$$\frac{1}{|Hx|} * \sum_{s}^{s \in Hx} \log\left(\frac{P(\{s\} \cup Ho)}{P(\{s\}) * P(Ho)}\right) * \frac{-1}{\log P(\{s\} \cup Ho)} \quad \text{Equation 4}$$

An example depicting the maximal semantic relationship (calculated for both metrics) is provided below. The example is with the maximum conditional probability:

$$\underset{s \in Hx}{\arg\max}(\max Prb(Ho, \{s\})) \quad \text{Equation 5}$$

As discussed above, one component of features extraction may involve determining the usefulness of any potential refinement. In this way, search refinement process 10 may be configured to determine what may be gained if the proposed refinement occurs. For example, the search "show me comedies" followed by "show me Adam Sandler's movies" is likely a refinement. In contrast, the search "show me Adam Sandler's movies" followed by "Show me comedies" is likely not a refinement since it does not significantly change the result of the previous query. Accordingly, this determination may provide a useful inquiry in order to determine the usefulness of the refinement. In some embodiments, a metric based, in part, upon the concept of information gain ratio may be applied as shown below. Here, the function H( . . . ) is the entropy:

$$\frac{H(m|Ho) - H(m|Hx \cap Hx)}{H(m|\emptyset)} \quad \text{Equation 6}$$

-continued $$e.g. \frac{\log(|\{\text{western, costner}\}|) - \log(|\{\text{silverado, western, costner}\}|)}{\log(N)}$$

As discussed above, one component of features extraction may involve determining the risk of any potential refinement. In this way, search refinement process 10 may be configured to determine what may be gained if the proposed refinement occurs. For example, the search "Search for Robert Deniro" followed by "The one with taxi driver in the title" is likely a refinement. The search "Search for Robert Deniro" followed by "The Comedies only" is also likely a refinement. However, in the later the second signal doesn't modify significantly the results and taking the decision to restrict the search would be taking a risk with no payout. As such, only the second example would be refined as the gain is sufficient to justify the risk. Accordingly, this determination may provide a useful inquiry in order to determine if the gain of a refinement justify the risk. For example, the need for refinement on a precise query (e.g. title) may be less necessary. In some embodiments, a metric based, in part, upon the concept of information gain ratio may be applied as shown below. Here, the function H is the entropy:

$$\frac{H(m|Hx) - H(m|Hx \cap Ho)}{H(m|\emptyset)} \qquad \text{Equation 7}$$

$$e.g. \frac{\log(|\{\text{western, costner}\}|) - \log(|\{\text{silverado, western, costner}\}|)}{\log(N)}$$

As discussed above, search refinement may include a source selection aspect. In some embodiments, source selection may include calculating a score for every potential refinement source using the matrix from the features extraction approach outlined above. A source may then be selected based on this score. In order to identify the most likely refinement source in the M matrix the following equation may be used:

$$\text{Select} \begin{pmatrix} i = -1: & \begin{bmatrix} f_1(Ho, x_{-1}) & \dots & f_F(Ho, x_{-1}) \\ \vdots & \ddots & \vdots \\ f_1(Hox_N) & \dots & f_F(Ho, x_N) \end{bmatrix} \end{pmatrix} = \qquad \text{Equation 8}$$

$$\max_i(\text{Score}(M_i))$$

Where the score is given by the following formula, where $K^d$ is a polynomial transformation of the features vector of degree d. A degree of 1 indicates no transformation. W is a matrix of weight of size F (number of feature)*d (degree).

$$\text{Score}(M_i) = K^d(M_i) * W \qquad \text{Equation 9}$$

$$W = \begin{bmatrix} W_1 \\ \dots \\ W_{F*d} \end{bmatrix} \qquad \text{Equation 10}$$

The weight vector W could then be learned using machine learning on collected and annotated information. In some embodiments, a SVM linear regression using as a target the $F_\beta$=0.5 (other values, e.g., between 0 and 2 may be used without departing from the scope of the present disclosure) score on the collected information could be used.

As discussed above, search refinement may also include a refined interpretation builder. In some embodiments, the refined interpretation builder may include selecting from the refinement source the information that may be added to the current search. For example, for the potential source "Search for Woody Allen comedies this week at ten":

Hx={INTENT:Search, GENRE:comedy, ACTOR:Woody Allen, DATE:week;0, TIME:2200}

Followed by "What about Adam Sandler at nine?":

Ho={Intent:ANAPHORA, ACTOR:Adam Sandler, TIME:2100}

Accordingly, the refined interpretation (R) may contain all the information from the current (Ho) interpretation:

R={Intent:Search(ANAPHORA), ACTOR:Adam Sandler, TIME:2100}

Next, the non-domain related information that isn't redefined may be added:

R={Intent:Search(ANAPHORA), ACTOR:Adam Sandler, TIME:2100, DATE:week;0}

Finally, the combination of domain related information from Hx which maximize conditional probability may be added:

R={Intent:Search(ANAPHORA), ACTOR:Adam Sandler, TIME:2100, DATE:week;0, GENRE:Comedy}

Figure 3:
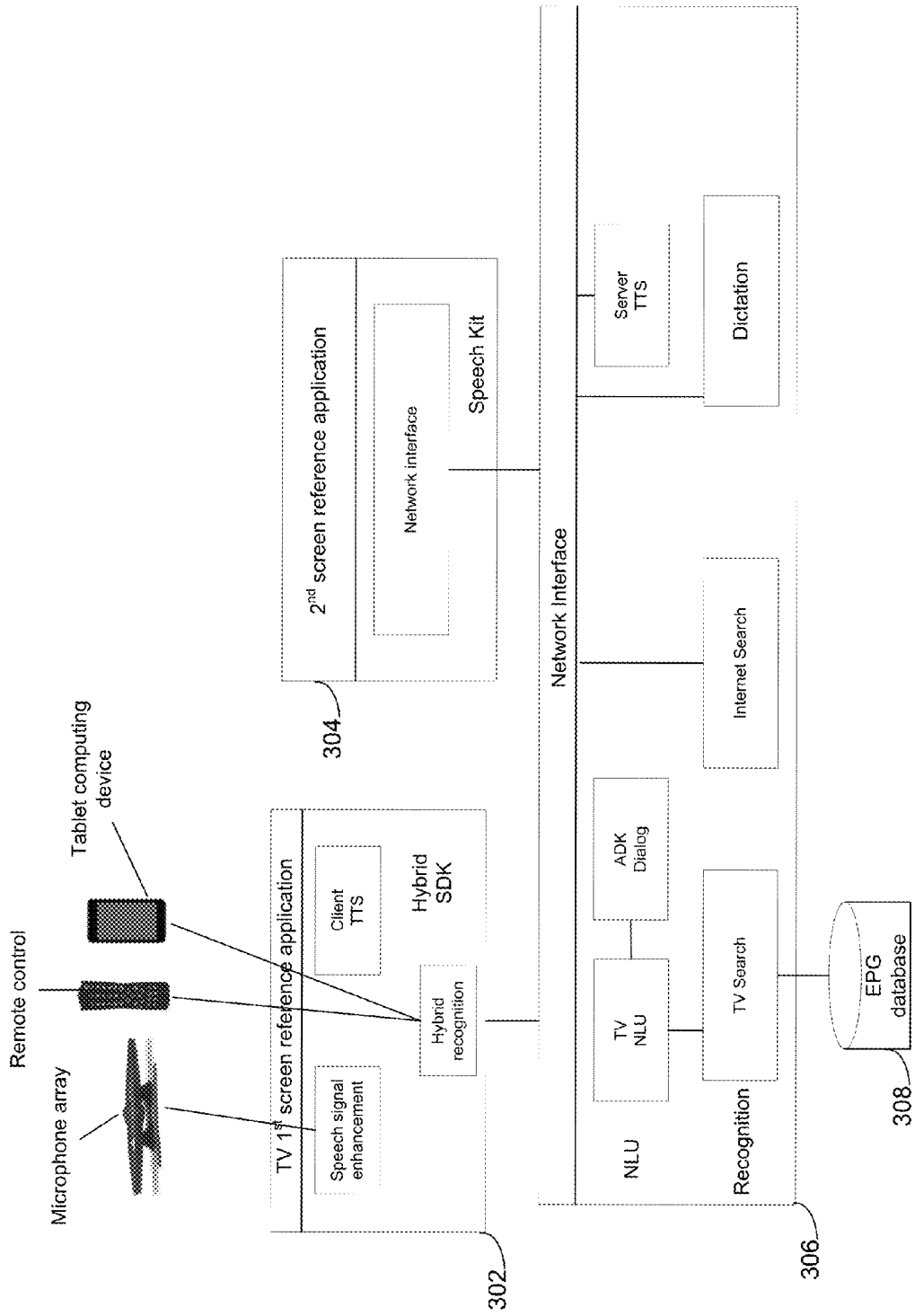
FIG. 3 is a diagrammatic view of a system configured to implement the search refinement process in accordance with another embodiment of the present disclosure.

Referring now to FIG. 3, an embodiment depicting a high-level architecture of an example system 300 configured to implement search refinement process 10 is provided. In this particular example, television viewers may be able to sit comfortably in a living room environment and be able to speak commands, searches and messages to their television (e.g. television 43) via one or more microphones. Accordingly, system 300 may include far-talk device 302, near-talk device, 304, server computing device 306, and storage device 308. In this particular example, far-talk device 302 may correspond to a television or set-top-box while near-talk device 304 may correspond to a cellphone, tablet, remote control, or other suitable device. The terms "far-talk" and "near-talk" are meant to indicate their relative proximity to the speaker's mouth. Devices 302 and 304 may communicate with server computing device 306 using an associated network interface. Although FIG. 3 depicts a television system it should be noted that embodiments of search refinement process 10 may be used in any suitable system. The present disclosure is not intended to be limited to the arrangement shown in FIG. 3 as it has been provided merely by way of example. For example, embodiments of search refinement process 10 may be used in a standalone product (e.g. a speech recognition application associated with a personal computer, etc.), an automobile application or system, or any other suitable device capable of receiving speech input.

As discussed above, search refinement process 10 may be directed towards applying information gain ratio to a search dialog for the detection of search refinement and refinement risk evaluation. Embodiments of the search refinement process described herein may be used to improve the performance of the search refinement dialog. In some embodiments, a search dialog may refer to a dialog that may be used to find an element based on one or more attributes, often as a subtask. In some embodiments, a search refinement may refer to a situation where the current search query is built upon information available in the previous searches.

In some embodiments, the search refinement process described herein may be configured to estimate the potential gain on search results of the refinement on a database covering a subset of the element that the user could be looking for in order to identify a case of search expansion and to adapt the decision to the risk associated with that particular case.

Examples of search refinement are described in further detail hereinbelow.

In the following examples, the second utterance may require information from the first utterance in order to produce the proper search query.

EXAMPLE 1

First utterance: "Look for action movie"
Second utterance: "One starring Stallone"

EXAMPLE 2

First utterance: "Search for action movies"
Second utterance: "Look for Stallone"

The refinement shown in Example 1 above is explicit (i.e., "One starring Stallone") while the refinement shown in Example 2 is more ambiguous. Accordingly, in some embodiments, search refinement process 10 may use information on the utterance realization and the semantic distance between the information contained in the first and second utterances in order to determine whether the refinement is necessary or not.

As discussed above, embodiments of search refinement process 10 may be used in a variety of different contexts, including, but not limited to, search expansion and risk evaluation. Examples of search expansion and risk evaluation are discussed herein.

An example depicting a search expansion problem is provided below.

EXAMPLE 3

First utterance: "Search for Harrison Ford"
Second utterance: "Search for the fugitive"

EXAMPLE 4

First utterance: "Search for the fugitive"
Second utterance: "Search for Harrison Ford"

In the above example, there are two ambiguous dialogs with the same utterances but permutated. In this particular case, the order of the utterances seems to have some importance. In Example 3, it is likely that the user was trying to refine his/her search and is actually looking for the movie titled "The Fugitive" starring Harrison Ford. In Example 4, it is more likely that the user wants to expand his/her search from "The Fugitive" to all movies starring Harrison Ford. A search refinement algorithm relying only on utterances realization and semantic relationship wouldn't see any difference between those two dialogs.

In the risk evaluation examples shown below, Example 5 indicates a refinement and the confidence of the algorithm would be high. However, Example 6 is more ambiguous and would have a low confidence. In Example 5, the results obtained from a search of "Taxi driver starring Deniro" may be similar to a search of "Taxi Driver" while in Example 6 the results will greatly differ whether a refinement is performed, e.g., "Comedies starring Robert Deniro" or "all comedies". In Example 5, the refinement may not be necessary as there may be little benefit and the displayed results would be small. In other words, the algorithm should have a high level of confidence in its decision before applying it. In Example 6, the user may be frustrated if the system returned a result for "all comedies" if the user was interested in those starring a particular actor. Accordingly, it may be beneficial for the refinement to be applied on the low confidence dialogs while discouraging refinement on the high confidence dialogs as it may negatively affect the user experience.

An example depicting a risk evaluation problem is provided below.

EXAMPLE 5

First utterance: "Search for Robert Deniro"
Second utterance: "Search for the one call taxi driver"

EXAMPLE 6

First utterance: "Search for Robert Deniro"
Second utterance: "Search for Comedies"

When faced with an ambiguous problem, some speech recognition algorithms may not always deliver the best result or refinement. One approach may involve determining a confidence threshold that the algorithm must have before applying a decision. However, if the threshold is the same for all cases the decision may not always have the same impact.

Embodiments of search refinement process 10 may include receiving (202), using one or more computing devices, a first speech signal corresponding to a first utterance and receiving (204) a second speech signal corresponding to a second utterance, wherein the second utterance is a refinement to the first utterance. For example, each utterance may be received at a computing device (e.g. television 43) and may be received from a user such as user 50 shown in FIG. 1. Specific examples of the first and second utterances are provided above. In some embodiments, the second utterance may be a refinement to the first utterance.

Accordingly, and as discussed above, search refinement process 10 may identify (206) information associated with the first speech signal as first speech signal information and may identify (208) information associated with the second speech signal as second speech signal information. The information extracted from each signal may be used to determine a number of search results as is discussed in further detail below.

Search refinement process 10 may determine (210) a first quantity of search results based upon, at least in part, the first speech signal information and may determine (212) a second quantity of search results based upon, at least in part, the second speech signal information. For example, each set of search results may be based upon a search of information included in one or more databases, such as database 308 shown in FIG. 3 or storage device 16 shown in FIG. 1.

Once each set of search results has been obtained, search refinement process 10 may further include comparing (214) at least one of the first quantity of search results and the second quantity of search results with a quantity of search results from a combination of the first and second signal information. In some embodiments, search refinement process 10 may then determine (216) an information gain from the comparison. As used herein the phrase "information gain" may refer to its customary meaning as well as to $IG(A,B)=H(A)-H(A|B)$. In some embodiments, search refinement process 10 may utilize an information gain ratio (sometimes referred to simply as gain ratio), for example, the information gain divided by a normalization ratio, normally the split information $IGR(A,B)=IG(A,B)/SplitInformation(A,B)$. In some embodiments, search refinement process 10 may utilize an information gain ratio formula specific to database entity as illustrated in Equations 5 and 6.

In some embodiments, search refinement process 10 may refine a search based upon at least in part, the information gain. Additionally and/or alternatively, search refinement process 10 may refine using one or more features vectors. In some embodiments, refining the search may include calculating a score for one or more potential refinement sources. For example, the higher the score for the potential refinement source, the more beneficial it may be to perform the refinement. Accordingly, source refinement process 10 may be configured to identify a most suitable refinement source from the one or more potential refinement sources based upon, at least in part, the score. Search refinement process 10 may also be configured to utilize the information gain in order to identify a search expansion (e.g. removing a constraint), a situation where a constraint is added, or where a constraint has been changed.

In this way, embodiments of search refinement process 10 may be used to estimate the potential gain provided by a particular search refinement. For example, the particular search results obtained from a database covering a subset of an element that the user could be looking for may be provided. Accordingly, search refinement process 10 may be configured to identify a case of search expansion and/or to adapt the decision threshold to the risk associated with that particular case.

In this way, if only a minor amount of information is gained by adding the information of the second utterance to the first utterance, it may be indicative of a search expansion situation. A knowledgeable user likely would not refine his/her query with information that is not discriminative. If little information is gained by adding the information of the second utterance to the first utterance, it may not be worth performing the refinement.

Additionally and/or alternatively, if only a minor amount of information is gained by adding the information of the first utterance to the second utterance, it may not be worth performing the refinement as the risk of performing the refinement is greater than is benefits.

In some embodiments, search refinement process 10 may be configured to estimate the potential gain by calculating the information gain on a subset of the potential element of adding the information of one utterance to the other. Search refinement process 10 may calculate the information gain as the difference between the search results generated using the information of one utterance (e.g. tile, actor . . . ) to the search results generated when combining both utterances. In some embodiments, the information gain may be normalized on the unconditioned entropy of the database elements. Search refinement process 10 may also use a smoothing technique to account for the fact that the database may cover a small portion of the domain.

Embodiments of search refinement process 10 may be used in accordance with a variety of different products and technologies. Some of these may include, but are not limited to, those associated with the entertainment/art domain (e.g. movie, television, music, books, etc.) as users may search using several combination of attributes (e.g., artist, title, genre, etc.). Additionally and/or alternatively, search refinement process 10 may be used in accordance with any product or service that may be configured to search for an element that may be identified by several attributes and/or subsets.

Embodiments of search refinement process 10 may utilize stochastic data models, which may be trained using a variety of domain data. Some modeling types may include, but are not limited to, acoustic models, language models, NLU grammar, etc.

In operation, and in an embodiment of search refinement process 10, one or more signals may be received at $t_1$. A second signal may be received at $t_2$. For every signal received at ti and one or more additional empty signals, search refinement process 10 may: identify information associated with the signal from "$t_1$" as first signal information, identify information associated with the signal from "$t_2$" as second signal information, compare at least one of the first quantity of search results and the second quantity of search results with the quantity of search results from a combination of the first and second signal information, and may determine an information gain from the comparison. Additionally and/or alternatively, search refinement process 10 may compute the adequacy of the first signal as a source for refinement based, at least in part, on the information gain ratio. Search refinement process 10 may also identify the signal information with the highest adequacy as the source and may add relevant signal information from the source to the second signal information.

Figure 4:
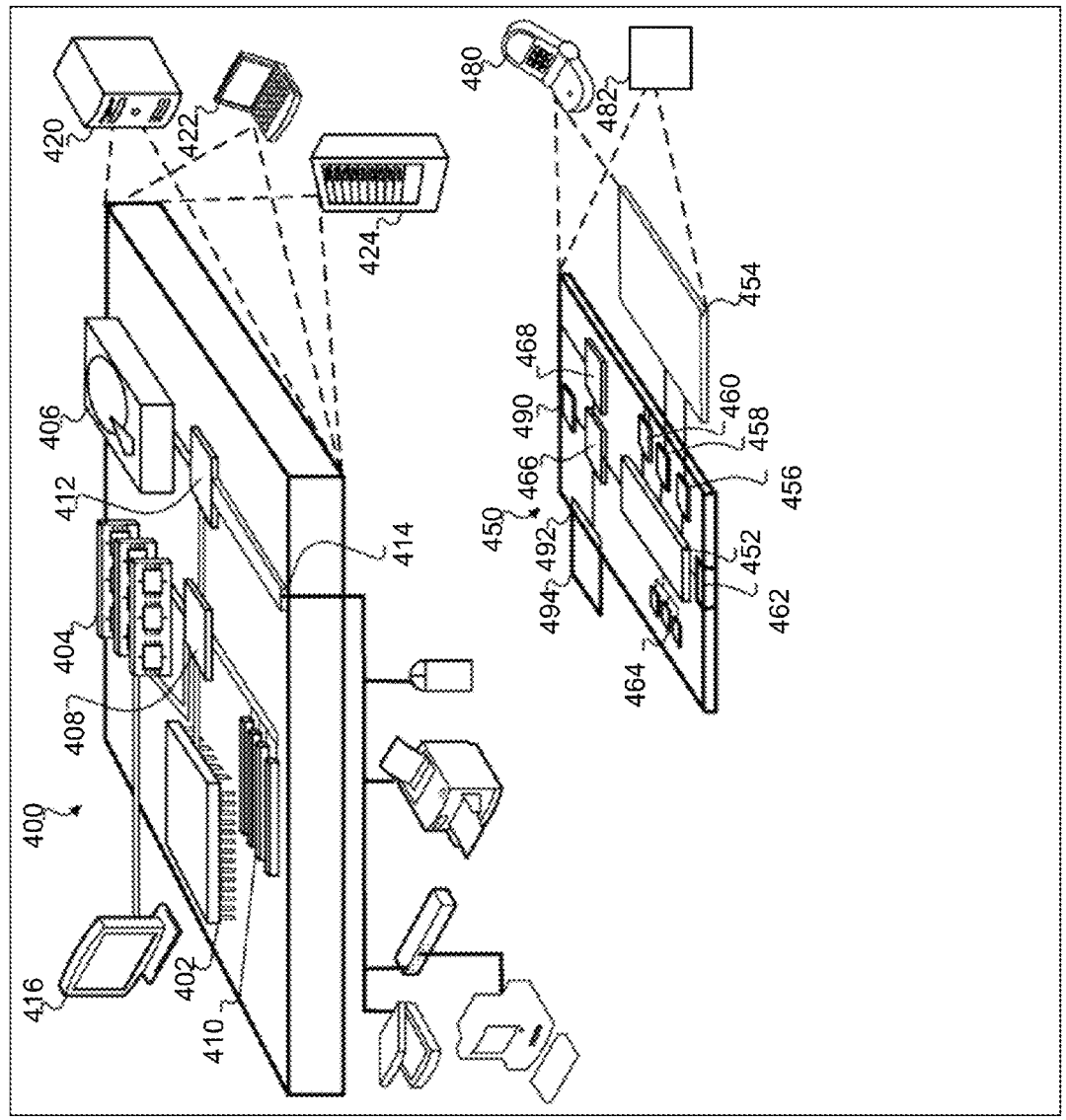
FIG. 4 shows an example of a computer device and a mobile computer device that can be used to implement the techniques described here.

Referring now to FIG. 4, an example of a generic computer device 400 and a generic mobile computer device 450, which may be used with the techniques described here is provided. Computing device 400 is intended to represent various forms of digital computers, such as tablet computers, laptops, desktops, workstations, personal digital assistants, servers, blade servers, mainframes, and other appropriate computers. In some embodiments, computing device 450 can include various forms of mobile devices, such as personal digital assistants, cellular telephones, smartphones, and other similar computing devices. Computing device 450 and/or computing device 400 may also include other devices, such as televisions with one or more processors embedded therein or attached thereto. The components shown here, their connections and relationships, and their functions, are meant to be exemplary only, and are not meant to limit implementations of the inventions described and/or claimed in this document.

In some embodiments, computing device 400 may include processor 402, memory 404, a storage device 406, a high-speed interface 408 connecting to memory 404 and high-speed expansion ports 510, and a low speed interface 512 connecting to low speed bus 414 and storage device 406. Each of the components 402, 404, 06, 408, 410, and 412, may be interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

Memory 404 may store information within the computing device 400. In one implementation, the memory 404 may be a volatile memory unit or units. In another implementation, the memory 404 may be a non-volatile memory unit or units. The memory 404 may also be another form of computer-readable medium, such as a magnetic or optical disk.

Storage device 406 may be capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

High speed controller 408 may manage bandwidth-intensive operations for the computing device 400, while the low speed controller 412 may manage lower bandwidth-intensive operations. Such allocation of functions is exemplary only. In one implementation, the high-speed controller 408 may be coupled to memory 404, display 416 (e.g., through a graphics processor or accelerator), and to high-speed expansion ports 410, which may accept various expansion cards (not shown).

In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 may include a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, may be interconnected using various buses, and several of the components may be mounted on a common motherboard or in other manners as appropriate.

Processor 452 may execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

In some embodiments, processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

In some embodiments, memory 464 may store information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation—and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

Computing device 450 may be implemented in a number of different forms, as shown in the figure. For example, it may be implemented as a cellular telephone 480. It may also be implemented as part of a smartphone 482, personal digital assistant, remote control, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

The term "machine-readable signal" refers to any signal used to provide machine instructions and/or data to a programmable processor.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method for refining a search comprising:
    receiving, using one or more computing devices, a first speech signal corresponding to a first utterance;
    receiving a second speech signal corresponding to a second utterance, wherein the second utterance is a refinement to the first utterance;
    determining a first quantity of search results based upon, at least in part, first speech signal information from the first speech signal;
    determining a second quantity of search results based upon, at least in part, second speech signal information from the second speech signal;
    comparing at least one of the first quantity of search results and the second quantity of search results with a third quantity of search results;
    determining an information gain from the comparison; and
    refining a search based upon at least in part, the information gain.

2. The method of claim 1, further comprising:
    identifying a search expansion, based upon, at least in part, the information gain.

3. The method of claim 1, further comprising:
    generating at least one set of search results based upon the refined search.

4. The method of claim 1, wherein refining is based upon, at least in part, one or more features vectors.

5. The method of claim 4, wherein refining includes, at least in part, calculating a score for one or more potential refinement sources.

6. The method of claim 5, further comprising:
    identifying a refinement source from the one or more potential refinement sources based upon, at least in part, the score.

7. A system for refining a search comprising:
    one or more computing devices configured to receive a first speech signal corresponding to a first utterance, the one or more computing devices further configured to receive a second speech signal corresponding to a second utterance, wherein the second utterance is a refinement to the first utterance, the one or more computing devices further configured to determine a first quantity of search results based upon, at least in part, the first speech signal information from the first speech signal and to determine a second quantity of search results based upon, at least in part, the second speech signal information from the second speech signal, the one or more processors further configured to compare at least one of the first quantity of search results and the second quantity of search results with a third quantity of search results and to determine an information gain from the comparison, the one or more processors further configured to refine a search based upon at least in part, the information gain.

8. The system of claim 7, wherein the one or more computing devices are further configured to identify a search expansion, based upon, at least in part, the information gain.

9. The system of claim 7, wherein the one or more computing devices are further configured to generate at least one set of search results based upon the refined search.

10. The system of claim 7, wherein refining is based upon, at least in part, one or more features vectors.

11. The system of claim 10, wherein refining includes, at least in part, calculating a score for one or more potential refinement sources.

12. The system of claim 11, wherein the one or more computing devices are further configured to identify a refinement source from the one or more potential refinement sources based upon, at least in part, the score.

13. A non-transitory computer readable storage medium having stored thereon instructions that when executed by a processor perform one or more operations, the operations comprising:
    receiving, using one or more computing devices, a first speech signal corresponding to a first utterance;
    receiving a second speech signal corresponding to a second utterance, wherein the second utterance is a refinement to the first utterance;
    determining a first quantity of search results based upon, at least in part, first speech signal information from the first speech signal;
    determining a second quantity of search results based upon, at least in part, second speech signal information from the second speech signal;
    comparing at least one of the first quantity of search results and the second quantity of search results with a third quantity of search results;
    determining an information gain from the comparison; and
    refining a search based upon at least in part, the information gain.

14. The computer readable storage medium of claim 13, further comprising:
    identifying a search expansion, based upon, at least in part, the information gain.

15. The computer readable storage medium of claim 13, further comprising:
    generating at least one set of search results based upon the refined search.

16. The computer readable storage medium of claim 13, wherein refining is based upon, at least in part, one or more features vectors.

17. The computer readable storage medium of claim 16, wherein refining includes, at least in part, calculating a score for one or more potential refinement sources.

* * * * *